(12) United States Patent
Noda et al.

(10) Patent No.: US 8,259,205 B2
(45) Date of Patent: *Sep. 4, 2012

(54) SOLID-STATE IMAGE PICKUP DEVICE

(75) Inventors: Tomoyuki Noda, Atsugi (JP); Fumihiro Inui, Yokohama (JP); Hidekazu Takahashi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

This patent is subject to a terminal disclaimer.

(21) Appl. No.: 12/470,543

(22) Filed: May 22, 2009

(65) Prior Publication Data

US 2009/0256937 A1    Oct. 15, 2009

Related U.S. Application Data

(62) Division of application No. 11/554,281, filed on Oct. 30, 2006, now Pat. No. 7,561,199.

(30) Foreign Application Priority Data

Nov. 18, 2005    (JP) .................................. 2005-334810

(51) Int. Cl.
*H04N 3/14* (2006.01)
*H04N 5/335* (2006.01)

(52) U.S. Cl. ........................................ 348/308; 348/294

(58) Field of Classification Search ........................ None
See application file for complete search history.

(56) References Cited

U.S. PATENT DOCUMENTS

| | | | |
|---|---|---|---|
| 5,892,540 A | 4/1999 | Kozlowski et al. | 348/300 |
| 6,747,264 B2 * | 6/2004 | Miida | 348/300 |
| 6,973,265 B2 | 12/2005 | Takahashi | 396/121 |
| 7,046,284 B2 | 5/2006 | Kozlowski et al. | 348/308 |
| 7,227,208 B2 | 6/2007 | Ogura et al. | 257/292 |
| 7,245,321 B2 | 7/2007 | Panicacci et al. | 348/241 |
| 7,319,218 B2 | 1/2008 | Krymski | 250/208.1 |
| 7,830,436 B2 | 11/2010 | Sumi et al. | |
| 2004/0080637 A1 * | 4/2004 | Nakamura et al. | 348/255 |
| 2005/0103977 A1 | 5/2005 | Krymski | 250/208.1 |
| 2005/0110002 A1 | 5/2005 | Noda | 257/21 |
| 2005/0168602 A1 * | 8/2005 | Sumi et al. | 348/294 |
| 2005/0168605 A1 | 8/2005 | Hiyama et al. | 348/301 |
| 2005/0179795 A1 | 8/2005 | Funatsu et al. | 348/302 |
| 2005/0259167 A1 | 11/2005 | Inoue et al. | 348/300 |
| 2005/0270392 A1 * | 12/2005 | Kikuchi | 348/308 |

(Continued)

FOREIGN PATENT DOCUMENTS

EP    0 813 338 A2    12/1997

(Continued)

*Primary Examiner* — Sinh Tran
*Assistant Examiner* — Jason Flohre
(74) *Attorney, Agent, or Firm* — Fitzpatrick, Cella, Harper & Scinto

(57) ABSTRACT

There is provided a solid-state image pickup device comprising a plurality of pixel units, each of which includes a photoelectric conversion element, a signal line which reads out signals from said plurality of pixel units, a first capacitor element which has a first electrode connected to the signal line, an amplifier which has an input terminal connected to a second electrode of the first capacitor element, and a second capacitor element connected between the input terminal and an output terminal of the amplifier, wherein the first capacitor element has a capacitance value which is smaller at the time of execution of an adding mode than at the time of execution of a non-adding mode, and thereby making an amplification factor of the amplifier smaller at the time of execution of the adding mode than at the time of execution of the non-adding mode.

6 Claims, 7 Drawing Sheets

U.S. PATENT DOCUMENTS

| | | |
|---|---|---|
| 2006/0238633 A1 | 10/2006 | Kinugasa et al. ............. 348/300 |
| 2007/0001252 A1 | 1/2007 | Noda et al. .................... 257/432 |
| 2008/0029793 A1 | 2/2008 | Watanabe et al. ............. 257/291 |
| 2008/0036890 A1 | 2/2008 | Yamashita et al. ............ 348/308 |
| 2011/0025420 A1 | 2/2011 | Sumi et al. |

FOREIGN PATENT DOCUMENTS

| | | |
|---|---|---|
| EP | 1 538 827 A1 | 6/2005 |
| EP | 1 564 986 A2 | 8/2005 |
| JP | 2001-94884 A | 4/2001 |
| JP | 2002-199284 A | 7/2002 |
| JP | 2003-18469 A | 1/2003 |
| JP | 2004-236305 A | 8/2004 |
| JP | 2005-33722 A | 2/2005 |
| JP | 2005-175517 A | 6/2005 |
| WO | WO 2005-006742 A1 | 1/2005 |

* cited by examiner

SOLID-STATE IMAGE PICKUP DEVICE

CROSS REFERENCE TO RELATED APPLICATION

The present application is a division of U.S. application Ser. No. 11/554,281, filed on Oct. 30, 2006, now U.S. Pat. No. 7,561,199 the entire disclosure of which is incorporated by reference herein.

BACKGROUND OF THE INVENTION

1. Field of the Invention

The present invention relates to a solid-state image pickup device, particularly to a solid-state image pickup device used in a scanner, video camera, digital still camera or the like.

2. Description of the Related Art

In recent years, there have been available image input apparatuses such as a digital camera, video camera and image reader. A CCD image sensor or a solid-state image pickup device called non-CCD image sensor such as a bipolar transistor image sensor, FET image sensor or CMOS image sensor are provided in an image input apparatus. A solid-state image pickup device converts optical image information into electrical signals. The obtained electrical signals are subjected to various types of signal processing and displayed on a display or recorded on a storage medium.

Solid-state image pickup devices of today which use an amplifying MOS sensor generally adopt progressive scanning, which scans each line, or row of pixels, in a sequential order. In order to support current television standards such as NTSC and PAL, means for adding pixel signals in the vertical direction in an image-pickup device are proposed. For a high-resolution solid-state image pickup device, there is proposed means for adding pixel signals in the vertical direction and horizontal direction in a solid-state image pickup device to read out, at high speed, signals of an image with a relatively low resolution into an electronic viewfinder, a small screen for monitoring or the like.

A CMOS sensor circuit having adding means is disclosed in Japanese Patent Application Laid-Open No. 2003-018469.

However, in the solid-state image pickup device of the above described patent document, if the number of pixels to be added increases, the amount of charge accumulated in a memory 16 increases, thus resulting in an increase in output voltage. This causes the problem of difference in output range between at the time of addition and at the time of non-addition. An arithmetic operation unit provided outside the solid-state image pickup device performs correction such that an output amplitude range at the time of non-addition and that at the time of addition coincide with each other.

SUMMARY OF THE INVENTION

The object of the present invention is to provide a solid-state image pickup device which maintains the same output range at the time of adding a plurality of pixel signals and at the time of not adding pixel signals, and maintains the same dynamic range in both cases.

According to the present invention, there is provided a solid-state image pickup device comprising a pixel unit having a plurality of photoelectric conversion elements, each of which converts incident light into an electrical signal and outputs the electrical signal, a signal line to which the electrical signals output from said plurality of photoelectric conversion elements are supplied commonly, an amplifier which has an input terminal connected to the signal line through a first capacitor element, and a second capacitor element connected between the input terminal and an output terminal of the amplifier, wherein an adding mode of adding the electrical signals output from said plurality of photoelectric conversion elements and a non-adding mode of not adding the electrical signals output from said plurality of photoelectric conversion elements are executed, and a capacitance value of the first capacitor element is smaller at the time of execution of the adding mode than at the time of execution of the non-adding mode, and an amplification factor of the amplifier is made smaller at the time of execution of the adding mode than at the time of execution of the non-adding mode.

It is possible to maintain the same output range at the time of adding a plurality of pixel signals and at the time of not adding pixel signals, and maintain the same dynamic range in both cases. This eliminates the need to provide an arithmetic operation unit outside the solid-state image pickup device, for maintaining an output amplitude range at the time of addition and an output amplitude range at the time of non-addition to coincide with each other, and thereby makes it possible to reduce load on an external system.

The solid-state image pickup device according to the present invention can make the dynamic range at the time of addition to be the same as that at the time of non-addition at higher precision.

Further features of the present invention will become apparent from the following description of exemplary embodiments with reference to the attached drawings.

DESCRIPTION OF THE EMBODIMENTS

Embodiments of the present invention will be specifically described.

First Embodiment

A solid-state image pickup device according to the first embodiment of the present invention will be described below. This embodiment will describe a case of vertical two-pixel summation.

Figure 1:
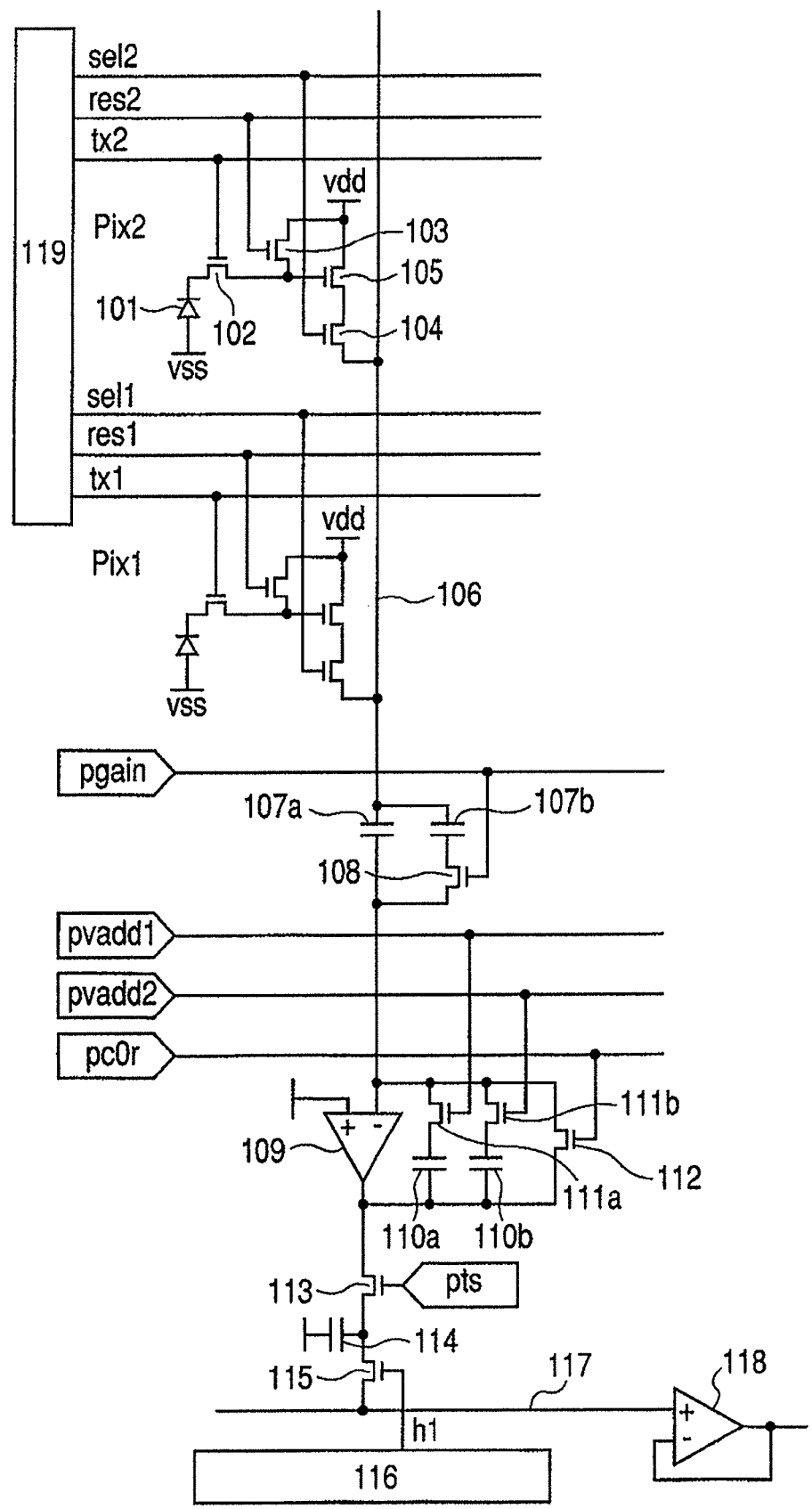
FIG. 1 is a diagram showing a circuit of a solid-state image pickup device according to a first embodiment of the present invention.

FIG. 1 is a diagram of an equivalent circuit of the solid-state image pickup device of the first embodiment and shows a part associated with 2×1 pixels of two-dimensionally arrayed pixels. A unit pixel has a photodiode 101 which is a photoelectric conversion element, an amplifying MOSFET 105 which amplifies a signal corresponding to the electrical charge generated by photoelectric conversion at the photodiode 101, and a switch 102 which transfers charge generated at the photodiode 101 to a gate electrode of the amplifying MOSFET 105. The unit pixel also has a reset switch 103 which resets a gate electrode of the amplifying MOSFET 105 to a predetermined voltage and a row selection switch 104 which controls electrical continuity between a source electrode of the amplifying MOSFET 105 and a vertical output line 106 which is a signal line. A row is selected by a vertical scanning circuit 119.

Reference numerals 107a and 107b denote clamp capacitors with a capacitance value C0. In this embodiment, two clamp capacitors with the same capacitance value are provided for each vertical output line 106. Reference numeral 108 denotes a clamp capacitor changeover switch. Reference numeral 109 denotes an operational amplifier; 110a and 110b, feedback capacitors with a capacitance value Cf; and 111a and 111b, switches for connecting or disconnecting capacitors 110a and 110b. The clamp capacitors 107a and 107b and the clamp capacitor changeover switch 108 constitute a clamp capacitor element serving as a first capacitor element. In each of the clamp capacitors constituting the clamp capacitor element, a first electrode is connected to the vertical output line 106, and a second electrode is connected to an inverted input terminal of the amplifier 109. The feedback capacitors 110a and 110b and the switches 111a and 111b constitute a feedback capacitor element serving as a second capacitor element. The feedback capacitor element is connected between the inverted input terminal and an output terminal of the amplifier 109. The ratio of capacitance between the clamp capacitor element and the feedback capacitor element can be changed by turning on or off each of the clamp capacitor changeover switch 108, switch 111a and switch 111b, and thereby change the gain of the amplifier 109. A gain G of the amplifier 109 is represented by G=c0/cF, where cF is a capacitance value of the feedback capacitor element, and c0 is a capacitance value of the clamp capacitor element. Reference numeral 112 denotes a clamp switch.

Reference numeral 114 denotes a sample hold capacitor; and 113, a SH transfer switch. Turning on the switch 113 causes a signal amplified by the amplifier 109 to be held in the capacitor 114. Reference numeral 115 denotes a horizontal transfer switch. When the switch 115 of a column selected by a horizontal scanning circuit 116 is turned on, a pixel signal is transferred to a horizontal output line 117 and externally output through a unity-gain output amplifier 118.

A readout method in a non-adding mode and one in an adding mode will be explained next. Assume that the capacitors 107a and 107b each have the capacitance value C0 and that the capacitors 110a and 110b each have the capacitance value Cf.

Figure 2:
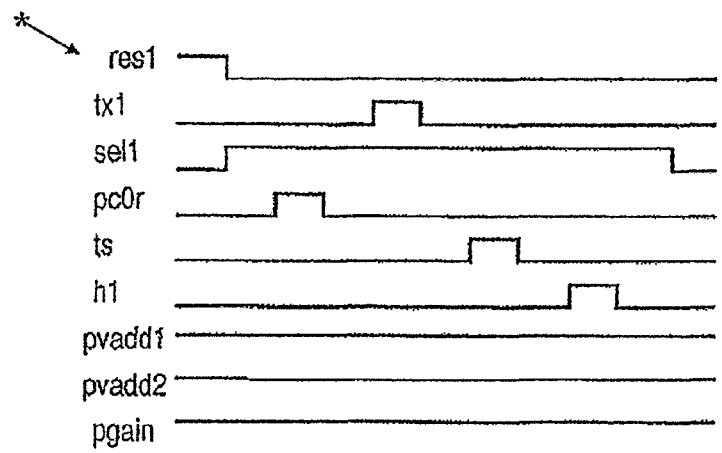
FIG. 2 is a chart showing the timing at the time of non-addition according to the first embodiment.

FIG. 2 shows the timing in the non-adding mode. In the non-adding mode, two capacitors, the clamp capacitors 107a and 107b are used. Assume that prior to readout operation, a predetermined exposure time has elapsed and that photo carrier is accumulated in each of the photodiodes 101. Signals pvadd1, pvadd2 and pgain are always at high level during operation in the non-adding mode, and the gain of the amplifier 109 is set to C0/Cf. Since the signal pgain is at high level, the switch 108 is turned on, and the two clamp capacitors 107a and 107b are connected in parallel. The capacitance value of the clamp capacitor element at this time is 2×C0. Since the signals pvadd1 and pvadd2 are at high level, the two feedback capacitors 110a and 110b are connected in parallel. The capacitance value of the feedback capacitor element at this time is 2×Cf. A method of setting the gain of the amplifier 109 to C0/Cf is not limited to the above described one. It can be achieved when the capacitance value of the clamp capacitor element serving as the first capacitor element and that of the feedback capacitor element serving as the second capacitor element are equal to each other. For example, the setting can also be implemented by always keeping the signal pgain at low level, always keeping either one of the signals pvadd1 and pvadd2 at low level, and the other at high level.

First, a signal res1 at high level of the vertical scanning circuit 119 resets the gate electrode of the amplifying MOSFET 105 of a pixel Pix1. A signal sel1 at high level of the vertical scanning circuit 119 causes the row, to which the pixel Pix1 belongs, to be selected. A pulse of a signal pc0r rises to high level, and noise in the pixel Pix1 is clamped. A pulse of a signal tx1 rises to high level, and a signal in the photodiode 101 of the pixel Pix1 is transferred to the gate electrode of the amplifying MOSFET 105. The signal of the pixel, from which noise caused by the amplifying MOSFET 105 is removed, is input to the amplifier 109. Raising a signal pts to high level causes the capacitor 114 to hold the signal of the pixel Pix1. Then, a signal of a column selected by the rise of a signal h1 from the horizontal scanning circuit 116, is transferred to the horizontal output line 117 and output from the output amplifier 118.

Figure 3:
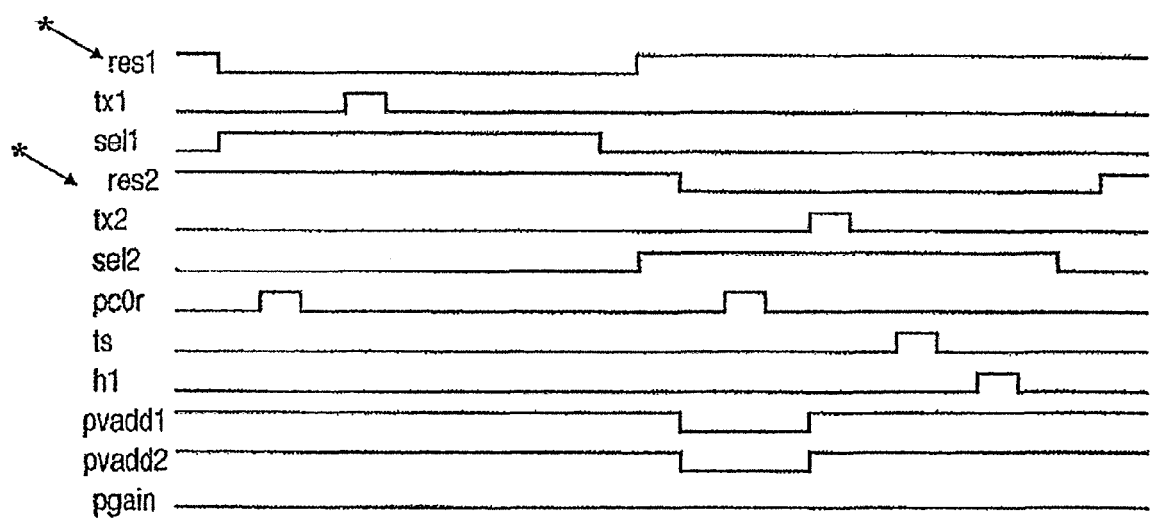
FIG. 3 is a chart showing the timing at the time of addition according to the first embodiment.

FIG. 3 shows the timing at the time of vertical two-pixel addition. Only one clamp capacitor, the clamp capacitor 107a in this case is used at the time of two-pixel addition. Assume that prior to readout operation, a predetermined exposure time has elapsed and that photo carrier is accumulated in each of the photodiodes 101. Since the signal pgain is always at low level during operation in the adding mode, the switch 108 is turned off, and only one of the clamp capacitors, the clamp capacitor 107a is connected. The capacitance value of the clamp capacitor element is C0. The gain of the amplifier 109 at this time becomes (½)×(C0/Cf). Since the signals pvadd1 and pvadd2 are at high level, the two feedback capacitors 110a and 110b are connected in parallel. The capacitance value of the feedback capacitor element is 2×Cf.

First, the signal res1 at high level of the vertical scanning circuit 119 resets the gate of the amplifying MOSFET 105 of the pixel Pix1, and a signal res2 at high level of the vertical scanning circuit 119 resets a gate of the amplifying MOSFET 105 of a pixel Pix2. The signal sel1 at high level of the vertical scanning circuit 119 causes the row, to which the pixel Pix1 belongs, to be selected. A pulse of the signal pc0r rises to high level, and noise in the pixel Pix1 is clamped. A pulse of the signal tx1 rises to high level, and a signal in the photodiode 101 of the pixel Pix1 is transferred. At this time, the signal of the pixel Pix1 is held in each of the feedback capacitors 110a and 110b. A signal sel2 of the vertical scanning circuit 119 rises to high level and causes a row, to which the pixel Pix2 belongs, to be selected. Both of the signals pvadd1 and pvadd2 are then lowered to low level. In this state, the pulse of the signal pc0r rises to high level, and noise in the pixel Pix2 is clamped. The signal of the pixel Pix1 is kept held in each of the feedback capacitors 110a and 110b. After both of the signals pvadd1 and pvadd2 rise to high level, a pulse of a signal tx2 rises to high level, and a signal in the photodiode 101 of the pixel Pix2 is transferred. At this time, the sum of the signal of the pixel Pix1 and the signal of the pixel Pix2 is held in each of the feedback capacitors 110a and 110b. Raising the signal pts to high level causes the sum of the signal of the pixel Pix1 and the signal of the pixel Pix2 to be transferred to the capacitor 114. Then, the switch 115 is selected by the rise of the signal h1 of the horizontal scanning circuit 116. The signal held in the capacitor 114 is transferred to the horizontal output line 117 and output from the unity-gain output amplifier 118.

In the case of two-pixel addition, the input range of the output amplifier can be kept the same in both the non-adding mode and in the adding mode by setting the gain of the amplifier 109 in the adding mode to ½ that in the non-adding mode. This makes it possible to maintain the dynamic range in the adding mode to be the same as that in the non-adding mode.

Second Embodiment

A solid-state image pickup device according to the second embodiment of the present invention will be described below. This embodiment will describe a case of vertical three-pixel addition.

Figure 4:
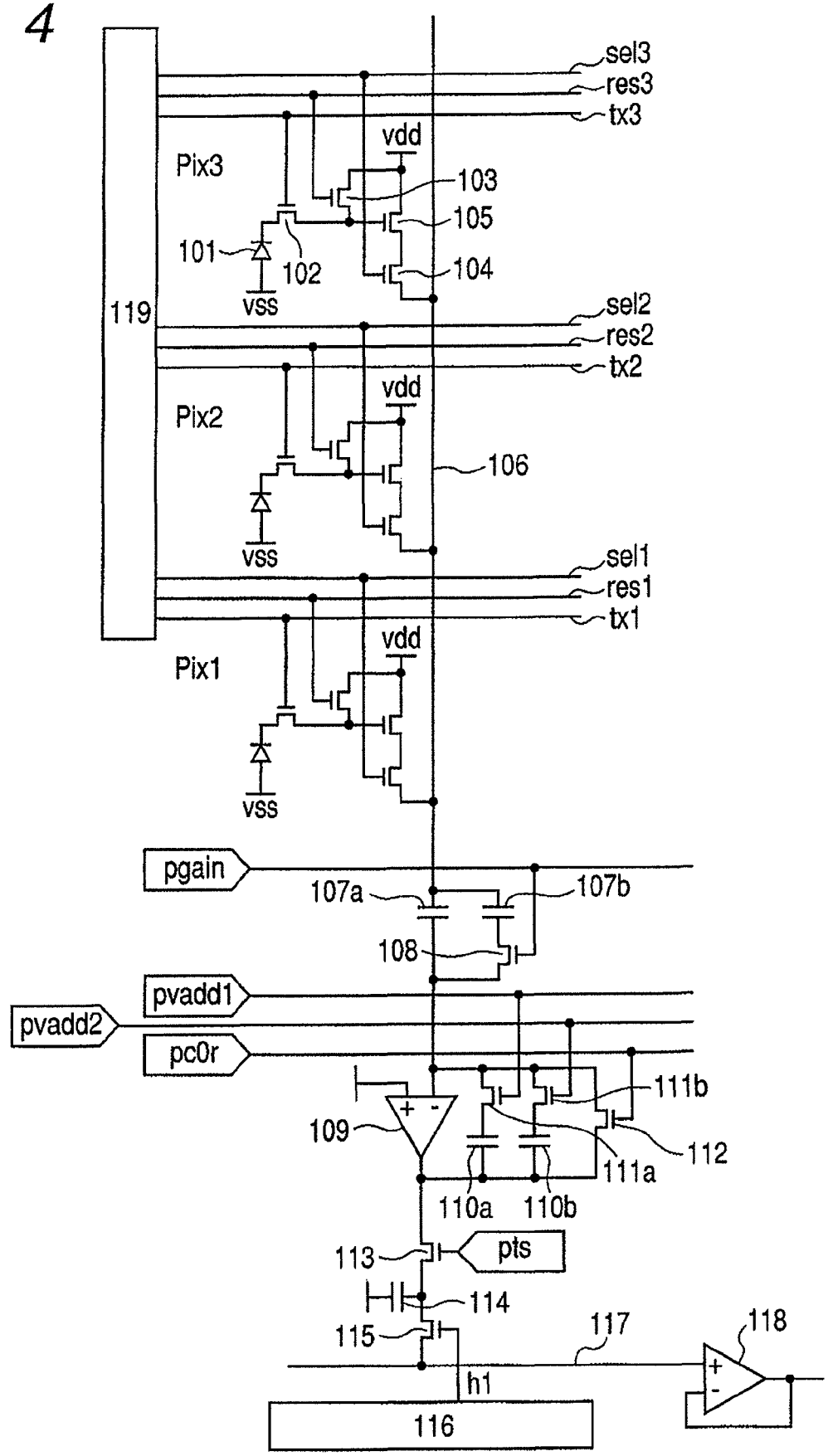
FIG. 4 is a diagram showing a circuit of a solid-state image pickup device according to a second embodiment of the present invention.

FIG. 4 is a diagram of an equivalent circuit of the solid-state image pickup device of the second embodiment and shows a part associated with 3×1 pixels of two-dimensionally arrayed pixels. An explanation of the components denoted by the same reference numerals as those in FIG. 1 will be omitted.

Since the second embodiment performs three-pixel addition, the capacitance value of a clamp capacitor element can be set to 1 or ⅓ of the capacitance value of a feedback capacitor element by controlling the clamp capacitor changeover switch 108.

Readout methods in a non-adding mode and in an adding mode will be explained next. Assume that capacitance value of capacitors 107a and 107b are (⅔)×C0 and (⅓)×C0 respectively, and that capacitors 110a and 110b each have a capacitance value of Cf.

Non-adding mode operates in the same manner as that in the first embodiment shown in FIG. 2. Pixels for three rows are sequentially read while signals pvadd1 and pvadd2 are always at high level, and a signal pgain is always at high level. Since the two clamp capacitors and the two feedback capacitors are used in the non-adding mode, the gain of an amplifier 109 is C0/Cf. A method of setting the gain of the amplifier 109 to C0/Cf is not limited to the above described one. It can be achieved when the capacitance value of a clamp capacitor element serving as a first capacitor element and that of a feedback capacitor element serving as a second capacitor element are equal to each other. For example, the setting can also be implemented by always keeping the signal pgain at low level, always keeping one of the signals pvadd1 and pvadd2 at low level, and always keeping the other at high level.

Figure 5:
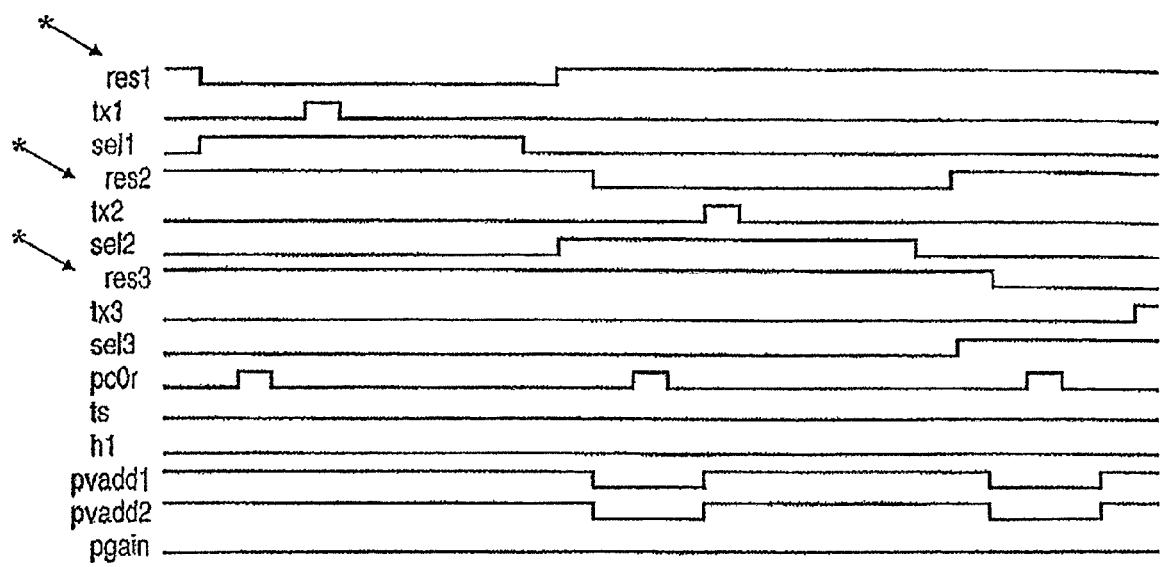
FIG. 5 is a chart showing the timing at the time of addition according to the second embodiment.

FIG. 5 shows the timing chart of vertical three-pixel adding. Since only the clamp capacitor 107a is used at the time of three-pixel summation, the gain of the amplifier 109 is (⅓)×(C0/Cf). Assume that prior to readout operation, a predetermined exposure time has elapsed and that photo carrier is accumulated in each of photodiodes 101. The signal pgain is always at low level during operation in the adding mode, and the gain of the amplifier 109 is set to (⅓)×(C0/Cf). When the signals pvadd1 and pvadd2 are at high level, the two feedback capacitors 110a and 110b are connected in parallel.

First, signals res1, res2 and res3 of a vertical scanning circuit 119 are raised to high level, and reset gates of amplifying MOSFETs 105 of pixels Pix1, Pix2 and Pix3. A signal sel1 at high level of the vertical scanning circuit 119 causes a row, to which the pixel Pix1 belongs, to be selected. A pulse of a signal pc0r rises to high level, and noise in the pixel Pix1 is clamped. A pulse of a signal tx1 rises to high level, and a signal in the photodiode 101 of the pixel Pix1 is transferred to the gate electrode of amplifying MOSFET 105. At this time, the signal in the photodiode 101 of the pixel Pix1 is held in each of the feedback capacitors 110a and 110b. A rise of signal sel2 of the vertical scanning circuit 119 then causes a row, to which the pixel Pix2 belongs, to be selected. Both of the signals pvadd1 and pvadd2 are lowered to low level. In this state, the pulse of the signal pc0r rises to high level, and noise in the pixel Pix2 is clamped. The signal of the pixel Pix1 is kept held in each of the feedback capacitors 110a and 110b. After both of the signals pvadd1 and pvadd2 are raised to high level, a pulse of a signal tx2 is raised to high level, and a signal in the photodiode 101 of the pixel Pix2 is transferred to the gate electrode of amplifying MOSFET 105. At this time, the sum of the signal of the pixel Pix1 and the signal of the pixel Pix2 is held in each of the feedback capacitors 110a and 110b. A signal sel3 at high level of the vertical scanning circuit 119 causes a row to which the pixel Pix3 belongs to be selected. Both of the signals pvadd1 and pvadd2 are lowered to low level. In this state, the pulse of the signal pc0r rises to high level, and noise in the pixel Pix3 is clamped. At this time, the sum of the signal of the pixel Pix1 and the signal of the pixel Pix2 is kept held in each of the feedback capacitors 110a and 110b. After both of the signals pvadd1 and pvadd2 are raised to high level, a pulse of a signal tx3 is raised to high level, and a signal in the photodiode 101 of the pixel Pix3 is transferred to the gate electrode of amplifying MOSFET 105. At this time, the sum of the signal of the pixel Pix1, the signal of the pixel Pix2, and the signal of the pixel Pix3 is held in each of the feedback capacitors 110a and 110b. Raising a signal pts to high level causes the sum of the signal of the pixel Pix1, the signal of the pixel Pix2, and the signal of the pixel Pix3 to be transferred to the capacitor 114. After that, a signal of a column selected by the rise of a signal h1 of the horizontal scanning circuit 116 is transferred to a horizontal output line 117 and output from a unity-gain output amplifier 118.

In the case of three-pixel addition, the input range of the output amplifier can be kept the same in both the non-adding mode and in the adding mode by setting the gain of the amplifier 109 in the adding mode to ⅓ that in the non-adding mode. This makes it possible to realize the dynamic range in the adding mode to be the same as that in the non-adding mode.

Third Embodiment

A solid-state image pickup device according to the third embodiment of the present invention will be described below. This embodiment will describe a case where vertical two pixels are added in a floating diffusion (to be referred to as FD hereinafter) unit.

Figure 6:
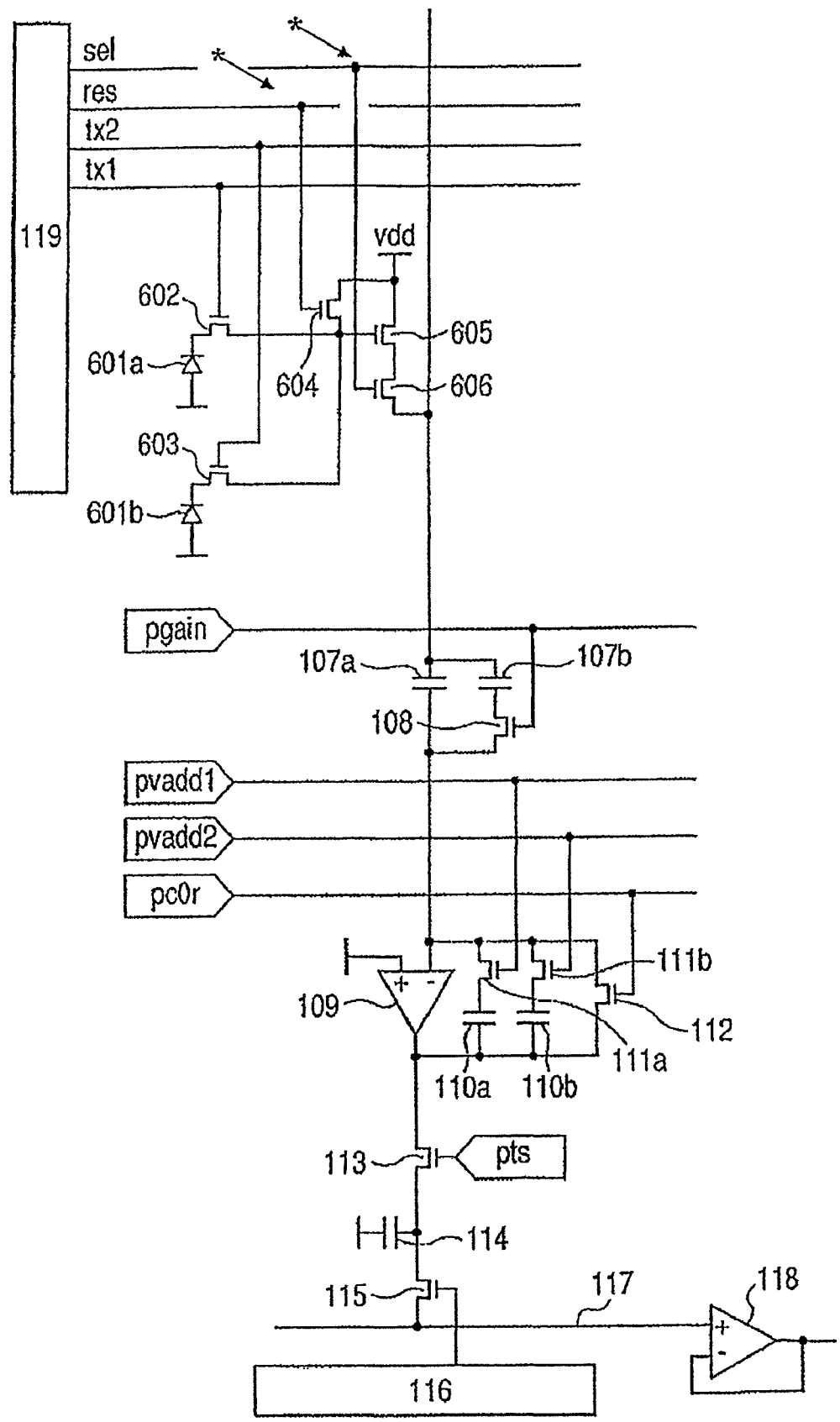
FIG. 6 is a diagram showing a circuit of a solid-state image pickup device according to a third embodiment of the present invention.

FIG. 6 is a diagram of an equivalent circuit of the solid-state image pickup device of the third embodiment and shows a part associated with 2×1 pixels of two-dimensionally arrayed pixels. An explanation of the components denoted by the same reference numerals as those in FIG. 1 will be omitted. As for pixels in this embodiment, two pixels share the FD unit. A unit pixel has photodiodes 601a and 601b, switches 602 and 603 which transfer charge generated at the photodiodes 601a and 601b to the gate electrode of an amplifying MOSFET 605 serving as a detection unit, and the amplifying MOSFET 605, which amplifies a signal generated at each of the photodiodes 601a and 601b. The unit pixel also has a reset switch 604 which resets the gate electrode of the amplifying MOSFET 605 to a predetermined voltage and a row selection switch 606 which controls electrical continuity between a source electrode of the amplifying MOSFET 605 and a vertical output line 106. The photodiodes 601a and 601b are photoelectric conversion elements which perform photoelectric conversion. A row is selected by a vertical scanning circuit 119.

A readout method in a non-adding mode and one in an adding mode will be explained next. Assume that capacitors 107a and 107b each have a capacitance value C0 and that capacitors 110a and 110b each have a capacitance value Cf.

The timing in the non-adding mode is the same as that in the first embodiment in FIG. 2. Since the two clamp capacitors and the two feedback capacitors are used in the non-adding mode, the gain of an amplifier 109 is C0/Cf.

Figure 7:
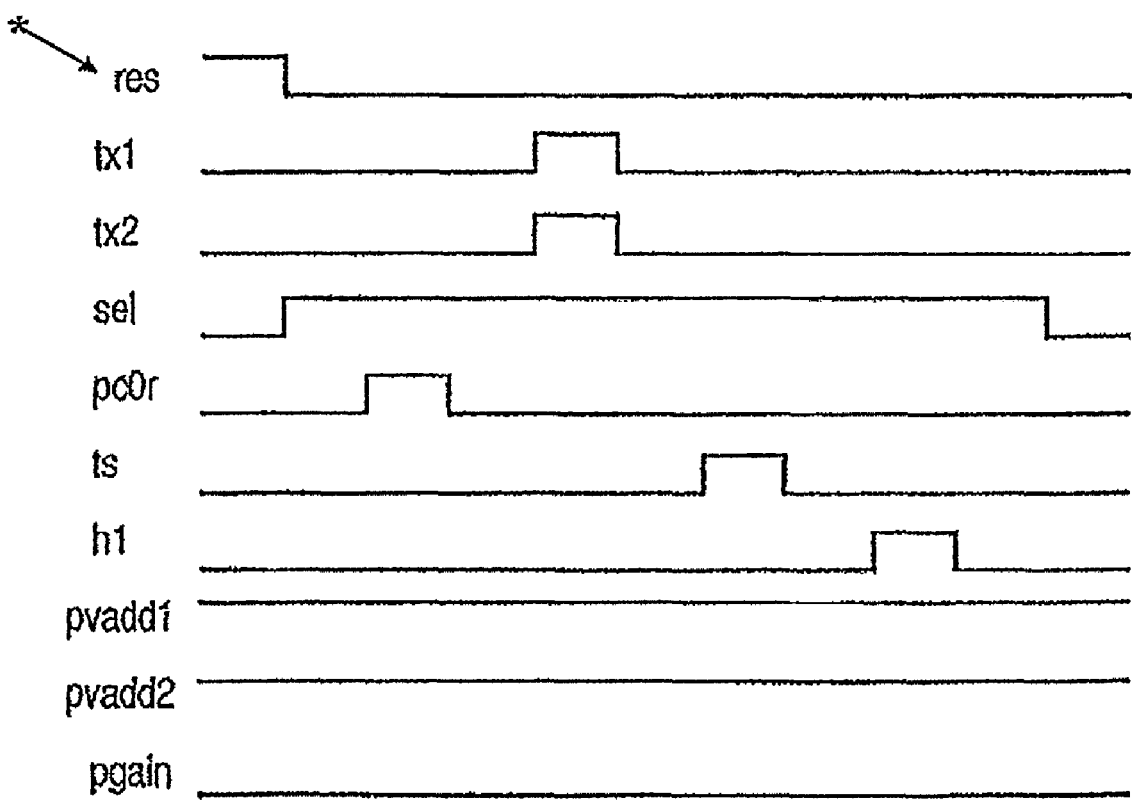
FIG. 7 is a chart showing the timing at the time of addition according to the third embodiment.

FIG. 7 shows the timing at the time of vertical two-pixel FD unit addition. Since only the clamp capacitor 107a is used at the time of two-pixel addition, the gain of the amplifier 109 is (½)×(C0/Cf). Assume that prior to readout operation, a predetermined exposure time has elapsed and that photo carrier is accumulated in each of the photodiodes 601a and 601b. A signal pgain is always at low level during adding operation, and the gain of the amplifier 109 is set to (½)×(C0/Cf). Since signals pvadd1 and pvadd2 are at high level, the two feedback capacitors 110a and 110b are connected in parallel.

First, a signal res at high level of the vertical scanning circuit 119 resets the gate of the amplifying MOSFET 605 of the two pixels. A rise of signal sel of the vertical scanning circuit 119 causes a row, to which the pixel corresponding to the photodiodes 601a and 601b belongs, to be selected. A pulse of a signal pc0r rises to high level, and noise in the pixel is clamped. Switches driven by signals tx1 and tx2 are simultaneously turned on, and charge accumulated in each of the photodiodes 601a and 601b is transferred to the floating diffusion unit. Raising a signal pts to high level causes a capacitor 114 to hold a signal of the pixel. After that, a signal of a column selected by the rise of a signal h1 of a horizontal scanning circuit 116 is transferred to a horizontal output line 117, and output from a unity-gain output amplifier 118.

In the case of two-pixel FD unit summation, the input range of the output amplifier can be kept the same in both the non-adding mode and in the adding mode by setting the gain of the amplifier 109 in the adding mode to ½ of that in the non-adding mode. This makes it possible to make the dynamic range in the adding mode to be the same as that in the non-adding mode.

Letting n be the number of pixels to be added, the amplification factor of the amplifier in the adding mode is generally set to 1/n of that in the non-adding mode. This makes it possible to maintain the same input range of the output amplifier in both modes and maintain the same dynamic range.

Fourth Embodiment

A solid-state image pickup device according to the fourth embodiment of the present invention will be described below. This embodiment will describe a case where vertical two-pixel adding is performed.

Figure 8:
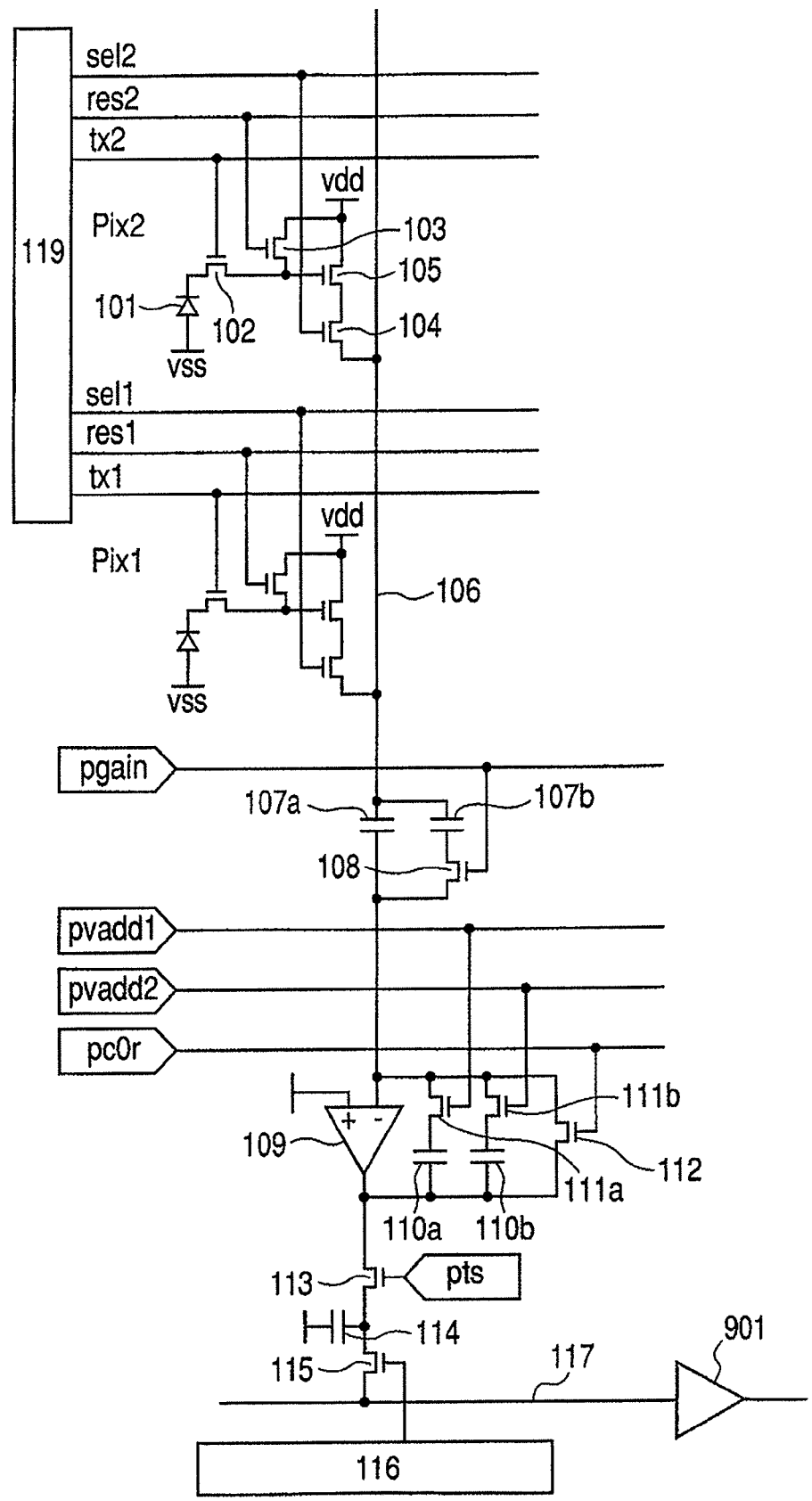
FIG. 8 is a diagram showing a circuit of a solid-state image pickup device according to a fourth embodiment of the present invention.

FIG. 8 is a diagram of an equivalent circuit of the solid-state image pickup device of the fourth embodiment and shows a part associated with 2×1 pixels of two-dimensionally arrayed pixels. An explanation of the components denoted by the same reference numerals as those in FIG. 1 will be omitted. Reference numeral 901 denotes an output amplifier having a variable amplification factor.

The operation timing at the time of non-adding is the same as that shown in FIG. 2. The operation timing at the time of summation is the same as that shown in FIG. 3.

Elements of the solid-state image pickup device suffer manufacturing variations. For this reason, even if the gain of an amplifier 109 is changed, as described in previous embodiments, an output amplitude range at the time of operation in an adding mode and that at the time of operation in a non-adding mode may not actually coincide with each other. In such a case, the output amplitude range can be kept the same with higher precision by using the output amplifier 901 having a variable amplification factor like this embodiment. This makes it possible to maintain the dynamic range in the adding mode to be the same as that in non-adding mode.

Although not shown, the solid-state image pickup device has a plurality of columns of pixels and has the amplifier 109 for each of the columns of pixels. There is variation among the amplifiers 109, and output amplitude ranges may differ among the columns of pixels. Even in such a case, use of the output amplifier 901 having a variable amplification factor like this embodiment makes it possible to keep the output amplitude range the same within each column of pixels and cause the output amplitude ranges of different columns of pixels to coincide with each other.

Since a large number of capacitors lead to an increase in chip area, the number of clamp capacitors and that of feedback capacitors provided for each column may be limited. Even under such conditions, use of an output amplifier having a variable amplification factor like this embodiment has an advantage over disuse of an amplification factor variable output amplifier, in that it is possible to control a larger variety of output amplitude ranges.

Note that the above described embodiments merely show specific examples for carrying out the present invention. The technical scope of the present invention should not be limitedly interpreted on the basis of the embodiments. That is, the present invention can be carried out in various forms without departing from the technical idea and main features thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2005-334810 filed Nov. 18, 2005, which is hereby incorporated by reference herein in its entirety.

What is claimed is:

1. A solid-state image pickup device comprising:
   a plurality of photoelectric conversion elements, each of which converts incident light into an electrical signal and outputs the electrical signal;
   an amplifier having an input terminal coupled to said plurality of photoelectric conversion elements through a first capacitor element; and
   a second capacitor element connected between the input terminal and an output terminal of said amplifier,
   wherein the solid-state image pickup device is operable in an adding mode of adding the electrical signals output from said plurality of photoelectric conversion elements and a non-adding mode of not adding the electrical signals output from said plurality of photoelectric conversion elements, and
   a ratio of a capacitance value of the first capacitor element to a capacitance value of said second capacitor element is smaller at the time of execution of the adding mode than at the time of execution of the non-adding mode.

2. The solid-state image pickup device according to claim 1, wherein the first capacitor element comprises a plurality of capacitors and one switch or more.

3. The solid-state image pickup device according to claim 2, wherein an amplification factor of said amplifier is made smaller at the time of execution of the adding mode than at the time of execution of the non-adding mode, and the amplification factor of said amplifier at the time of execution of the adding mode is $1/n$ of the amplification factor of said amplifier at the time of execution of the non-adding mode, where n is the number of photoelectric conversion elements associated with addition.

4. The solid-state image pickup device according to claim 2, wherein the electrical signals output from the plurality of photoelectric conversion elements are added in said second capacitor element.

5. The solid-state image pickup device according to claim 2, wherein said plurality of photoelectric conversion elements are connected to a common detection unit, and the electrical signals output from said plurality of photoelectric conversion elements are added in said detection unit.

6. The solid-state image pickup device according to claim 2, further comprising an output amplifier whose input terminal is connected to the output terminal of said amplifier, and has a variable amplification factor.

* * * * *